United States Patent

Ress

[15] 3,671,675

[45] June 20, 1972

[54] HIGH-FREQUENCY COMMUNICATION SYSTEM

[72] Inventor: Thomas I. Ress, 8245 Baldwin Circle, Buena Park, Calif. 90620

[22] Filed: June 17, 1969

[21] Appl. No.: 834,100

[52] U.S. Cl. ....179/15 FD, 339/96, 174/70 C

[51] Int. Cl. ....H04j 1/00

[58] Field of Search ....179/2.5, 15 R, 15 BP; 339/96; 174/70, 70 C

[56] References Cited

UNITED STATES PATENTS 2,790,029 4/1957 Hansen ....179/15 BP 3,401,469 9/1968 Shaver ....339/96 UX Primary Examiner—Ralph D. Blakeslee Attorney—Karl F. Ross

[57] ABSTRACT

A panel consisting of two dielectric sheets on opposite sides of a thin metallic layer, sandwiched between two grounded metal plates, serves for the conveying of messages between several transmitting and receiving stations operating on different carrier frequencies. A station can be plugged in, for transmission or reception, at virtually any location along the panel by insertion of a probe through the proximal dielectric sheet; communication is thus possible between stations on either side of the panel.

12 Claims, 4 Drawing Figures

INVENTOR:
Thomas I. Ress

BY

Karl F. Ross
Attorney

HIGH-FREQUENCY COMMUNICATION SYSTEM

My present invention relates to a high-frequency communication system particularly adapted for use in buildings, vehicles and other surroundings where persons at various locations alongside a common wall or similar structure may wish to exchange messages with one another.

In a large office, for example, occupants of different desks in the same or separate rooms may have to communicate occasionally with one another and/or with a central station (e.g. the manager's desk). Similarly, passengers in an airplane occupying widely separated seats may desire to converse with one another without disturbing other passengers, or with the stewardess, or to receive flight instructions from the captain or an entertainment program selectable from several such programs. Communication systems hitherto used for these purposes generally required extensive wiring, particularly if cross-connections between a large number of transmitting and/or receiving stations had to be established.

It is, therefore, the principal object of my invention to provide an improved communication system for the purpose set forth which avoids the need for such wiring.

Another object of my invention is to provide a communication system of this character designed to accommodate not only fixed but also portable stations, enabling the transmitters or receivers of such stations to be plugged in at will anywhere along a structure which forms a common communication channel for these stations.

A further object is to provide a signal-transmitting channel for such a system which is virtually tamperproof and immune from short circuits.

I have found, in accordance with my present invention, that communication between any number of transmitting and/or receiving stations without objectionable cross-talk can be established with the aid of a panel formed from at least one dielectric sheet carrying a thin conductive layer on one surface while having its other surface juxtaposed with a grounded metal plate which thus is parallel to the conductive layer and effectively constitutes a two-dimensional transmission line therewith. Unlike conventional unidimensional transmission lines, this panel is substantially unaffected by local short circuits insofar as message transmission by way of high-frequency carriers is concerned, preferably carriers whose wavelengths are short compared with the major dimensions of the panel. Such a carrier may be injected into the panel at any point, even in the vicinity of a local short circuit, by inserting an output lead of a transmitting station through the dielectric sheet, or possibly through a second dielectric sheet on the opposite side of the conductive layer, into contact with this layer to connect the transmitter output across the two-dimensional transmissions line formed by the panel. In a similar manner, the carrier so injected may be retrieved at a receiving station having its input connected across the panel with the aid of a lead traversing the same (or the opposite) dielectric sheet to contact the conductive layer. These output and input leads may be part of respective probes each adapted to penetrate the dielectric sheet at any location while insulating the lead itself from the usually grounded metal plate concurrently traversed by it. If the dielectric sheet consists of elastomeric material, the opening formed by the inserted probe may close up automatically as soon as the probe is withdrawn.

In order to maximize the area of the panel available for transmission and reception, I prefer to provide the panel with a marginal zone designed to suppress signal reflection at the edges, this zone having a width equal to or greater than a quarter wavelength of the lowest carrier frequency to be transmitted. (By "wavelength" is meant the propagation wavelength along the panel which may differ from the free-space wavelength as is well understood in the art.) In contradistinction to the main portion of the panel, which is of substantially uniform cross-section so as to have a predetermined characteristic impedance, this marginal zone is of progressively varying cross-section so as to have a series conductance which tapers toward the panel edge. This progressive decrease in conductance can be achieved, for example, by letting the thickness of the conductive layer decrease to near-zero at the panel edge. In an advantageous embodiment, this thickness is on the order of a wavelength of ultraviolet light (e.g. about 3,000 angstroms with an aluminum conductor) throughout the main portion of the panel, decreasing by several orders of magnitude (e.g. to about 30 angstroms) to a minimum wave at the edge. Alternately, or in addition, a reduction of the standing-wave ratio may also be realized by subdividing the marginal zone of the panel into a series of generally triangular segments with exponentially curved flanks.

The invention will be described in greater detail hereinafter with reference to the accompanying drawing in which.

Figures 1, 2, 3, 4:
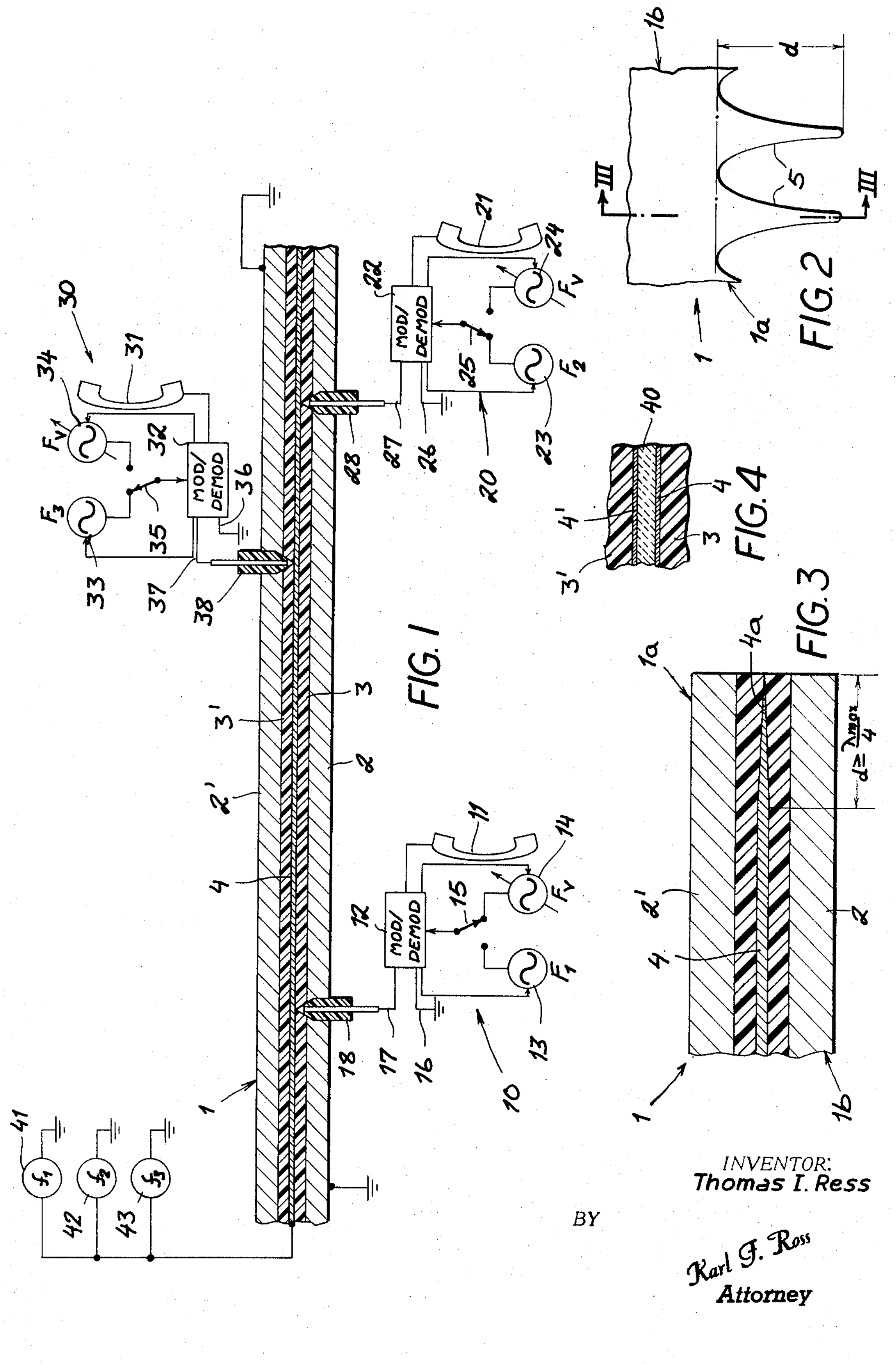
FIG. 1 is a longitudinal sectional view of several stations and a common transmission panel forming part of a system according to the invention.
FIG. 2 is a fragmentary top view of the edge portion of the panel, drawn to a larger scale.
FIG. 3 is a cross-sectional view taken on line III—III of FIG. 2.
FIG. 4 is a detail view similar to FIG. 3, showing a modification.

The system shown in FIG. 1 comprises a panel 1 and a plurality of associated transmitting and receiving stations 10, 20, 30, representative of any number of such stations. The panel 1 consists of a stack of flat elements including a pair of metal plates 2, 2′ which may give it the necessary mechanical strength and may form part of a partition, wall, ceiling or other two-dimensional structure of, preferably, rectangular outline. It will be understood that the panel need not lie entirely in one plane but may also form corners and curves.

Sandwiched between the plates 2 and 2′ are two dielectric sheets 3, 3′ which may be formed as coatings on plates 2 and 2′, respectively, and may consist of any of a variety of polymeric materials, such as polystyrene, polyethylene or natural rubber conventionally used for insulating purposes. A thin conductive layer 4 extends between the sheets 3, 3′ and is preferably coextensive with the other plates 2, 2′; this layer, e.g. of copper, silver, stainless steel or nickel-chrome alloy, may be formed (e.g. by plating, vapor deposition or sputtering) on one of the two confronting surfaces of sheets 3 and 3′.

The three affiliated stations 10, 20, 30 are shown to be of identical construction and include respective telephone handsets 11, 21, 31, conventional modulating/demodulating circuits 12, 22, 32, fixed local oscillators 13, 23, 33 tuned to a characteristic carrier frequency $F_1$, $F_2$, $F_3$ for the respective station, adjustable local oscillators 14, 24, 34 with a variable-frequency output $F_v$, and switches 15, 25, 35 for selectively connecting the heterodyning stages 12, 22, 32 to either of the two associated oscillators. These heterodyning circuits are provided with ground leads 16, 26, 36 and with ungrounded leads 17, 27, 37, the latter terminating at the tips of respective probes 18, 28, 38 inserted through sheets 2 (stations 10 and 20) and 2′ (station 30) to contact the layer 4.

As illustrated in FIG. 1, station 10 has its switch 15 in "transmitting" position in which variable oscillator 14 is connected to circuit 12; stations 20 and 30 have their switches 25 and 35 in "receiving" positions, respectively connecting their fixed oscillators 23 and 33 to circuits 22 and 32. In order to communicate with station 20, the operator at station 10 adjusts oscillator 14 to the characteristic frequency $F_2$ of the former so that the receiver in the handset 21 of that station picks up a message transmitted via panel 1 over carrier frequency $F_2$. Inasmuch as station 30 is not tuned to that carrier frequency, its receiver 31 will not pick up the message. Conversely, if the operator at station 10 switches the oscillator 14 to carrier frequency $F_3$, his message will be received by station 30 to the exclusion of station 20.

In the same manner, station 20 or 30 may transmit to either of the two other stations. Naturally, any number of such stations may thus communicate with the aid of the same panel 1.

The stations 10, 20, 30 may also be equipped with conventional signaling means not shown, such as lamps or buzzers, which respond to a call signal transmitted from the originating station over their characteristic carrier frequencies to alert the users of these stations to the fact that someone wishes to communicate with them.

The carrier frequencies $F_1$, $F_2$, $F_3$ etc. are all preferably in the high-megacycle range, with wavelengths equal to a fraction of the distance between probes 17, 27, 37 etc. If a short circuit develops in the direct line between any two such probes, communication between the corresponding stations will not be seriously affected unless the short lies within a small fraction of a quarter wavelength from either probe. Even in such a case, proper communication can be established by withdrawing the corresponding probe and reinserting it into the panel at a different location.

In FIGS. 2 and 3 I have illustrated a marginal zone 1*a* of the panel whose depth *d* is not greater than a quarter wavelength of the lowest carrier frequency. Within this zone, as shown in FIG. 2, the stack of panel-forming elements 2 – 4 is indented to form generally triangular serrations 5 whereby the effective series conductance of the panel diminishes progressively from the main panel portion 1*b* to the panel edge. A similar progressive reduction in series conductance is achieved by a tapering of the conductive layer 4 within zone 1*a* as illustrated at 4*a* in FIG. 3. Thus, for example, if layer 4 is made of aluminum, its thickness may decrease from 3,000 A in main portion 1*b* to 30 A at the outer edge of marginal portion 1*a;* the flanks of serrations or tongues 5 follow a generally exponential law of curvature.

The two measures illustrated in FIGS. 2 and 3 may also be used individually rather than together.

Naturally, the stations 10, 20, 30 shown in FIG. 1 need not all be equipped for both transmission and reception. Thus, for example, stations 10 and 20 may operate as transmitters of two different entertainment programs which may be selectively picked up by station 30 whose oscillator 34 must be tuned for this purpose to carrier frequency $F_1$ or $F_2$. Conversely, station 10 may be the only transmitter and may be used by a supervisor to send instructions to personnel reached over stations 20 and 30. Any of these stations may be portable for use anywhere along the panel 1; the metal plates 2, 2' may be provided, for this purpose, with multiple perforations adapted to receive the probes 18 etc.

The shunt capacitance of the panel may be lowered, e.g. for the purpose of decreasing the attenuation, by making the sheets 3, 3' cellular and/or discontinuous (e.g. as a honeycombtype web) rathan than solid, thereby reducing the mean dielectric constant of the insulating medium separating the conductors 4 and 2, 2'. The thickness of this insulating medium, of course, must be small compared to the quarter wavelength of any frequency to be transmitted thereover, the same as with conventional strip lines or ordinary transmission lines.

In a practical embodiment, using carrier frequencies on the order of 25 mc for amplitude modulation and on the order of 100 mc for frequency modulation, no objectionable reduction in transmission strength arose from short circuits placed at a distance of 2 to 3 centimeters from an input or output junction.

The coupling circuits 17/18, 27/28, 37/38 should have a low impedance (as seen from the panel), advantageously on the order of 1 ohm or less, for most efficient operation.

The central conductor 4 may be mounted on a nonconductive rigid backing strip 40, FIG. 4, of somewhat harder material than the dielectric layers 3, 3' to resist penetration by the contacting probes. If these probes are to be inserted into the panel from opposite sides, a second identical layer 4' must be provided on the opposite side of backing strip 40, the two layers being capacitively coupled to each other.

If a ferromagnetic material, such as stainless steel, is used for the conductors 4 and 4', the resultant increase in the inductivity of the two-dimensional transmission line reduces the attenuation (at the expense of a slight increase in propagation time) in accordance with the well-known Pupin effect.

The individual carrier waves $F_1$, $F_2$, $F_3$ may be derived from pilot frequencies $f_1, f_2, f_3$ injected into the panel by respective generators 41, 42, 43 (FIG. 1), these pilot frequencies advantageously constituting submultiples of the respective carriers which can then be identically reproduced at each station by means of oscillation generators (i.e. local oscillators 13, 14 etc.) designed as conventional frequency multipliers controlled by coupling circuits 12, 22, 32. This eliminates the need for crystal-controlled oscillators to drive the modulators and demodulators of intercommunicating stations. The number of pilot frequencies may be less than the number of carriers if some of the latter are harmonically related to one another.

The system herein disclosed affords privacy by being virtually immune from interception by external receivers; a similar immunity exists from interference by external transmitters.

I claim:

1. A communication system comprising a panel formed from dielectric sheet means, a thin conductive layer on said sheet means, and a grounded metal plate disposed parallel to said layer alongside said sheet means and separated thereby from said layer; at least one transmitting station having an output circuit connected across said layer and said plate, said output circuit including a first lead traversing said sheet means for conductive contact with said layer at a first point; and at least one receiving station having an input circuit connected across said layer and said plate, said input circuit including a second lead traversing said sheet means for conductive contact with said layer at a second point remote from said first point; said transmitting and receiving stations being provided with modulating and demodulating means operation on at least one carrier frequency; said panel having a main portion of substantially uniform cross-section and a marginal zone of progressively varying cross-section with a series conductance tapering toward the panel edge, the width of said zone being at least equal to a quarter wavelength of the lowest carrier frequency.

2. A communication system as defined in claim 1 wherein said sheet means comprises a first sheet between said layer and said plate and a second sheet on the side of said layer opposite said plate.

3. A communication system as defined in claim 2 wherein said panel further includes a second grounded metal plate extending parallel to said layer alongside said second sheet.

4. A communication system as defined in claim 2 wherein said panel further includes a nonconductive, rigid backing strip between said sheets carrying said conductive layer adjacent said first sheet and a second, substantially identical layer adjacent said second sheet.

5. A communication system as defined in claim 1 wherein said leads are parts of probes removably inserted in said sheet means.

6. A communication system as defined in claim 1 wherein the thickness of said layer decreases progressively by at least one order of magnitude toward the panel edge throughout said marginal zone.

7. A communication system as defined in claim 1 wherein said layer is formed with generally triangular indentations bounded by exponentially curved flanks throughout said marginal zone.

8. A communication system as defined in claim 1, further comprising at least one other receiving station having an input lead traversing said sheet means for conductive contact with said layer at a third point remote from said first and second points.

9. A communication system as defined in claim 8 wherein said receiving stations have demodulating means operating on different carrier frequencies, said transmitting station having switchover means for selectively tuning said modulating means to either of said carrier frequencies.

10. A communication system as defined in claim 1, further comprising oscillator means connected across said layer and said plate, for transmitting at least one pilot frequency along said layer, said modulating and demodulating means including circuitry for deriving from said pilot frequency a carrier frequency harmonically related thereto.

11. A communication system as defined in claim 1 wherein said conductive layer consists of ferromagnetic material.

12. A communication system comprising a panel formed from a pair of dielectric sheets, nonconductive rigid backing plate between said sheets, a pair of substantially identical thin conductive layers on opposite sides of said backing plate adjacent said sheets, and a grounded metal plate disposed parallel to said layers alongside one of said sheets and separated thereby from said backing plate and said layers; at least one transmitting station having an output circuit connected across one of said layers and said metal plate, said output circuit including a first lead traversing one of said sheets for conductive contact with said one of said layers at a first point; and at least one receiving station having an input circuit connected across one of said layers and said metal plate, said input circuit including a second lead traversing one of said sheets for conductive contact with the last-mentioned layer at a second point remote from said first point; said transmitting and receiving stations being provided with modulating and demodulating means operating on at least one carrier frequency.

* * * * *